3,223,207
DISK BRAKE FLUID INLET AND
BLEEDING ARRANGEMENT
Richard T. Burnett and James J. Powlas, South Bend, Ind., assignors to The Bendix Corporation, South Bend, Ind., a corporation of Delaware
Original application Nov. 21, 1960, Ser. No. 70,640, now Patent No. 3,166,156, dated Jan. 19, 1965. Divided and this application Nov. 30, 1964, Ser. No. 414,704
4 Claims. (Cl. 188—152)

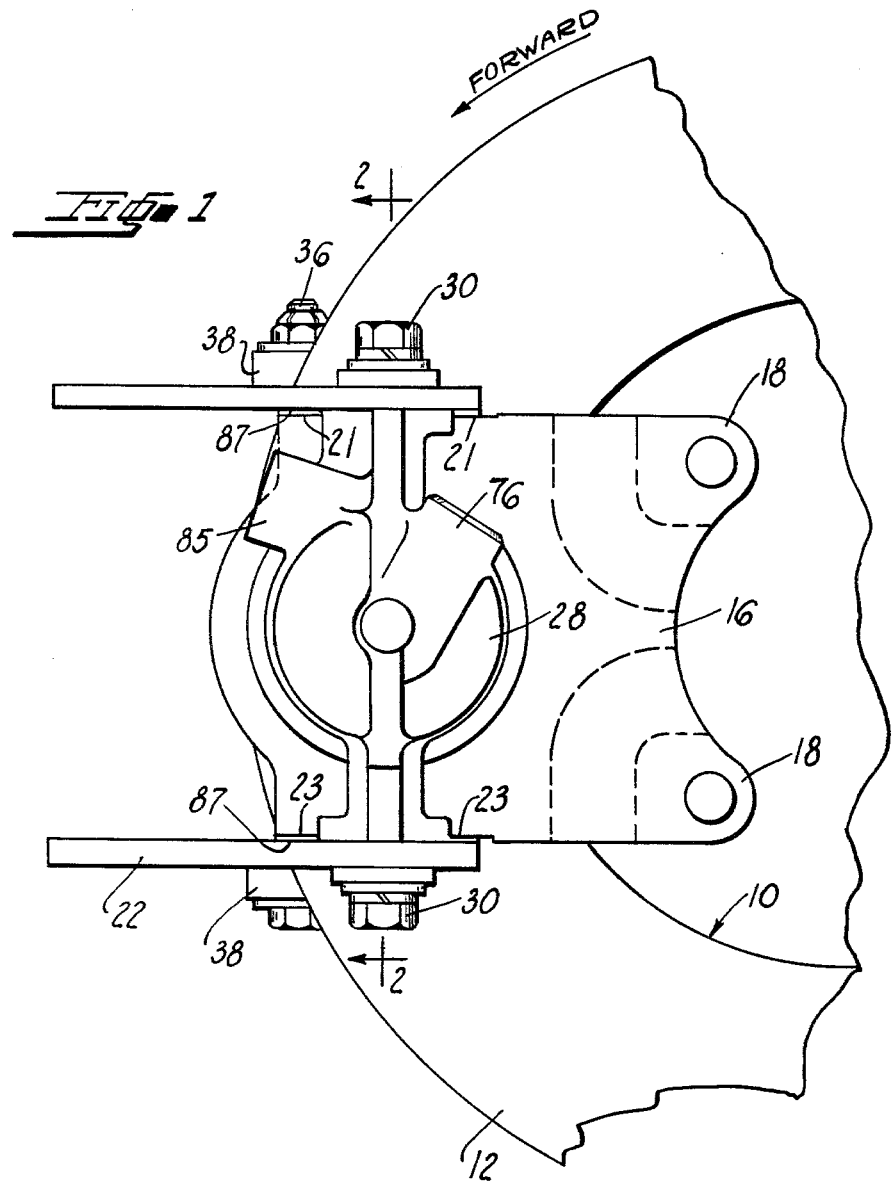

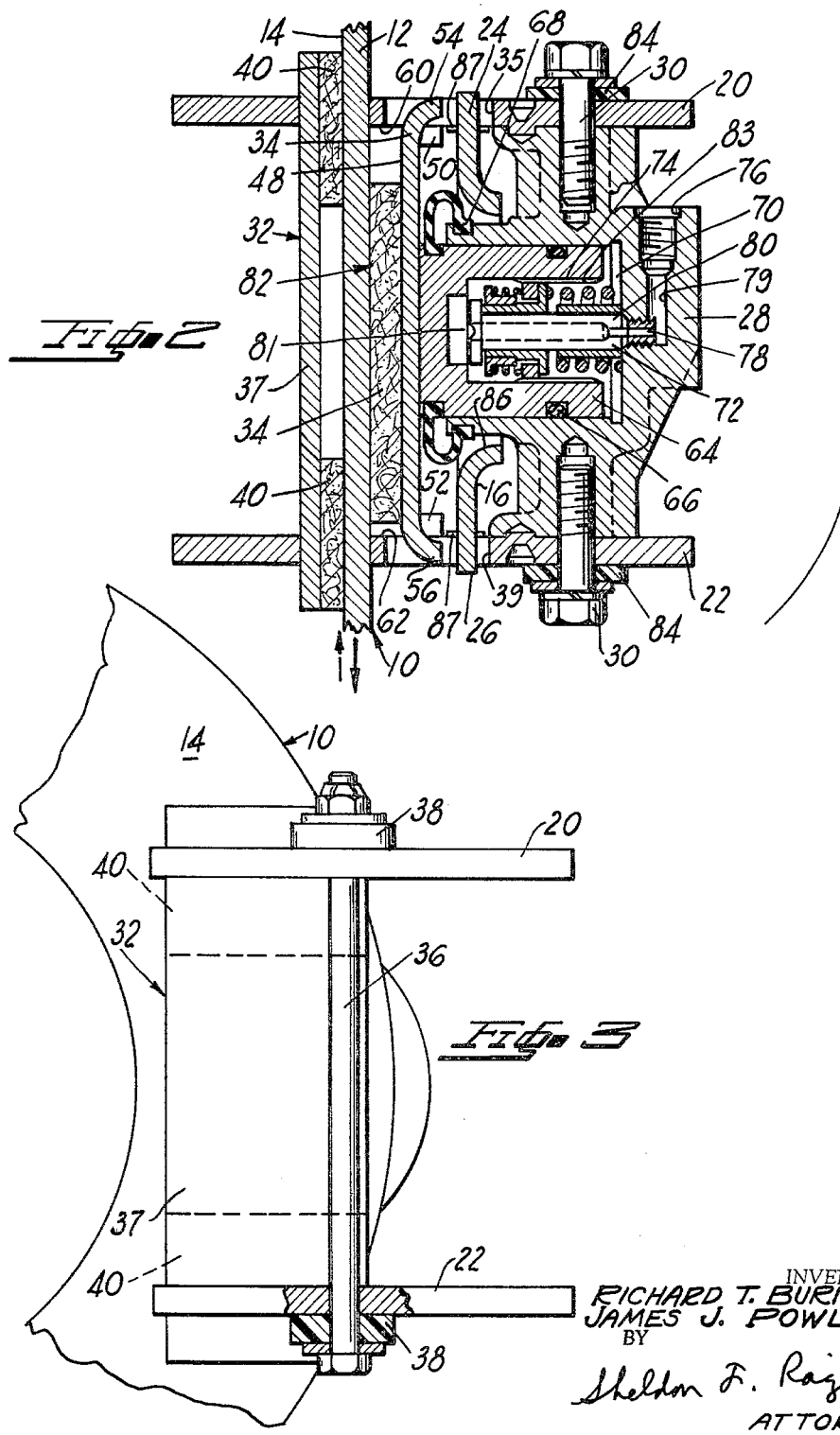

This application is a division of our co-pending application Serial No. 70,640, filed on November 21, 1960, now Patent No. 3,166,156.

This invention concerns a disk brake hydraulic motor which includes an automatic adjuster for adjusting the released position of an actuating piston.

The main object of this invention is to ensure complete bleeding of air from the hydraulic motor when it is filled with brake fluid.

Other objects will become apparent to those skilled in the art from the following description with reference to the drawings wherein:

FIGURE 1 is a side elevational view of the brake as it is installed on the right front vehicle wheel, with a portion of the rotor broken away;

FIGURE 2 is a sectional view taken on line 2—2 of FIGURE 1; and

FIGURE 3 shows the outboard side of the brake or the side of the brake opposite that shown in FIGURE 1.

Referring now to the drawings, there is illustrated a brake rotor 10 having annular, oppositely-facing braking surfaces 12 and 14 which make up the rotatable part of the brake structure. The rotor is fastened in some convenient manner at its radially inner portion to a rotatable part of the vehicle such as an axle flange (not shown).

The nonrotatable part of the brake structure comprises a mounting member 16 having at its radially inner ends 18 portions adapted for mounting on a fixed part of the brake such as an axle housing or the like (not shown). The mounting member provides two edge faces 21 and 23 which form anchoring surfaces for the brake.

There is mounted on member 16 a four sided cage structure which moves slidably on anchoring surfaces 21 and 23 but is prevented from rotating circumferentially by said surfaces 21 and 23, the cage being made up of: two spaced brackets 20, 22 which straddle the outer periphery of the motor and are guided by engagement with lugs 24, 26 of the member 16; a fluid motor housing 28 having bolt connections 30 with the brackets 20, 22; and a friction member 32 which is fixed to the brackets at the outboard side of the brake together with a bolt 36 which fastens to the brackets 20, 22 through rubber washers or the like 38 that deaden vibration conducive to brake noise. To further reduce brake noise, there is a resilient spring 87 between each bracket 20, 22 and its anchoring surface 21, 23 of the mounting member 16 to cushion the anchoring load and prevent rattles and similar brake noises. The cage structure is free to move pivotally on lugs 24, 26 in a plane transversely to the rotor 10 thereby enabling the friction members 32, 34 on each side of the rotor to conform with their opposed rotor surfaces. The described movement of the cage is permitted because the cross section of the lugs is narrow relative to the slots 35, 39 which are the supporting means between the cage and mounting member 16. Moreover, the cage is free to pivot in the plane and in the direction indicated by the arrows in FIGURE 2. In this instance the cage moves at one or the other of the anchoring edges 21 or 23 of the mounting member 16, also contributing to freedom of movement of the friction members 32, 34 so that they will conform to the opposing rotor surfaces in spite of deflections thereof.

The outboard friction member 32 comprises a backing 37 having spaced segments of friction material 38 and 40. The other friction member 34, which is at the inboard side of the brake includes a backing 48 having turned back flanges 50 and 52 at its opposite ends and additional flanges 54, 56 also located at the ends of the frction member to fit slidably within slots 35 and 39 of the brackets 20, 22 thereby guiding the friction member 34 in its lateral movement toward and away from the face 12 of the rotor 10. The flanges 50, 52 bear against the inner faces 60 and 62 of the brackets 20, 22 respectively, transmitting the anchoring force of friction member 34 to one or the other bracket depending upon the direction of rotor rotation during braking operation.

Within the fluid motor housing 28 is a fluid pressure responsive piston 64 having an O-ring seal 66 and a rubber or the like sealing boot 68 which protects against entry of dirt within the power chamber 70. Also within the fluid motor housing is an automatic adjuster 72 which does not form a part of the present invention and is disclosed in detail in U.S. Patent No. 3,134,459, previously filed by us. In brief, the automatic adjuster serves to locate the piston 64 more closely to the rotor as the friction segments become worn in order to maintain a proper running clearance in the brake between the friction members and the opposed rotor surfaces and also to effect retraction of the piston by a fixed amount following each brake application by a retracting spring 74. Details of the structure may be had by reference to the aforesaid U.S. Patent No. 3,134,459.

The invention concerns a novel provision for fluid inlet and bleeding of fluid from the housing 28. The novel inlet means comprises a port 76 connecting with passage 79, longitudinal passage 78 in stem 80 which terminates in chamber 81, there being a number of grooves 83 through which the fluid then passes to the power chamber 70 where is can be bled from bleeder port 85. Due to this arrangement, fluid will have to pass through the chamber 81 prior to entering the power chamber 70, thus forcing any air in chamber 81 out of chamber 81 into the power chamber 70 and out the bleeder port 85. If a conventional inlet system were used, wherein the inlet passage 79 communicates directly with the power chamber, fluid will tend to pass directly through the power chamber to the bleeder port 85 without necessarily forcing air out of the chamber 81. In other words, air is likely to be trapped in the chamber 81 when a conventional system is used, while complete removal of air from chamber 81 is ensured by the novel arrangement disclosed herein.

In operation, the brake is applied by communicating fluid pressure to inlet 76 through passage 78 of the stem 80 and into chamber 70 thus effecting displacement of piston 64 toward the left (FIGURE 2) causing the friction member 34, which is in abutment with the end of the piston 64, to move toward the left thereby engaging friction material lining 82 with surface 12 of the rotor 10. The piston extends through an opening 86 of the support member to be in direct engagement with the friction member 34. The fluid pressure simultaneously urges the housing 28 toward the right (FIGURE 2) thereby drawing the brackets 20, 22 toward the right which slide at notches 35, 39 on lugs 24, 26 of the mounting member 16. The bracket's movement as described draws friction member 32 toward the surface 14 of the rotor thereby engaging friction segments 40 against the surface 14 of the rotor 10.

While the embodiments of the invention as herein disclosed constitutes a preferred form, it is to be understood that other forms may be adopted, all coming within the scope of the claims which follow.

We claim:

1. In a brake: a cylinder housing having a bore closed at the rear end thereof, and open at the front end thereof, a piston slidable in said bore, a recess in said piston open at the rear end thereof, said recess and said bore together defining a fluid chamber, a member secured at the rear end thereof to said closed end of said bore and extending forwardly therefrom into said recess, automatic adjusting means surrounding said member and operatively connected thereto and to said piston for adjusting the released position of said piston, said automatic adjusting means separating said fluid chamber into a front portion which is entirely within said piston recess and a rearward portion, passage means communicating said front portion of said fluid chamber with said rear portion of said fluid chamber, and fluid inlet passage means located in the closed end of said bore and within said member opening into said front portion of said fluid chamber.

2. The structure as recited in claim 1 wherein said first named passage means comprises a portion of said adjusting means.

3. The structure as recited in claim 1 wherein said member is elongated, said last named passage means includes a longitudinal bore in said elongated member communicating with that portion of said last named passage means in the closed end of said cylinder bore.

4. The structure as recited in claim 1 wherein at least one groove is in the wall of said recess, said adjusting means comprises an annular element gripping said wall with a portion thereof bridging said groove, said first named passage means comprising said portion of said annular element and said grove.

No references cited.

ARTHUR L. LaPOINT, *Primary Examiner.*